US009475513B2

(12) United States Patent
Liu et al.

(10) Patent No.: US 9,475,513 B2
(45) Date of Patent: Oct. 25, 2016

(54) PALLET TRUCK

(71) Applicant: BIG LIFT, LLC., Lombard, IL (US)

(72) Inventors: Yuanwei Liu, Hangzhou (CN);
Feiquan Meng, Hangzhou (CN);
Jinhui He, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 91 days.

(21) Appl. No.: 14/514,666

(22) Filed: Oct. 15, 2014

(65) Prior Publication Data
US 2016/0023872 A1 Jan. 28, 2016

(30) Foreign Application Priority Data

Jul. 25, 2014 (CN) ..................... 2014 2 0418854 U
Jul. 25, 2014 (CN) ..................... 2014 2 0418876 U

(51) Int. Cl.
*B66F 3/24* (2006.01)
*B62B 3/00* (2006.01)
*B62B 3/06* (2006.01)
*B62B 5/00* (2006.01)

(52) U.S. Cl.
CPC ............. *B62B 3/001* (2013.01); *B62B 3/0612* (2013.01); *B62B 3/0618* (2013.01); *B62B 5/0053* (2013.01); *B62B 5/0069* (2013.01)

(58) Field of Classification Search
USPC ....................................................... 254/2 R
See application file for complete search history.

(56) References Cited

U.S. PATENT DOCUMENTS

| | | |
|---|---|---|
| D136,279 S | 8/1943 | Holland et al. |
| 2,592,091 A | 4/1952 | Weaver |
| 3,043,388 A | 7/1962 | Hansen |
| 3,249,170 A * | 5/1966 | Quayle ................. B62B 3/0612 180/13 |
| 3,295,881 A | 1/1967 | Worthington |
| 3,601,423 A * | 8/1971 | Goodacre ............. B62B 3/0612 280/43.12 |
| D222,670 S | 11/1971 | Goodacre |
| 3,854,748 A * | 12/1974 | Goodacre ............... B60P 1/025 254/2 R |
| D239,165 S | 3/1976 | Mono |
| 4,047,698 A | 9/1977 | Ellis |
| 4,065,012 A | 12/1977 | Rocco |
| 4,096,961 A | 6/1978 | Rocco |
| 4,103,795 A | 8/1978 | Miller |
| 4,287,959 A * | 9/1981 | Inman ...................... B60K 1/02 180/12 |
| 4,577,463 A | 3/1986 | Kedem |
| 4,589,669 A * | 5/1986 | Kedem ................. B62B 3/0618 254/2 R |
| 4,615,533 A | 10/1986 | Sewell |
| 5,113,960 A * | 5/1992 | Prinz ..................... B62B 3/0612 180/65.51 |
| 5,174,415 A * | 12/1992 | Neagle ................. B66F 9/07563 180/209 |
| D343,935 S | 2/1994 | Drobeck et al. |
| 5,417,541 A * | 5/1995 | Herron ................. B62B 3/0618 414/346 |

(Continued)

OTHER PUBLICATIONS

Brochure for "PDS Power Drive Straddle Trucks" issued by Blue Giant®, Sep. 1, 2010 (2 pages).

(Continued)

*Primary Examiner* — Alvin Grant
(74) *Attorney, Agent, or Firm* — Cook Alex, Ltd.

(57) ABSTRACT

A pallet truck is provided having an electrical system that reduces wear and the likelihood of fracture of the control wiring and output cable by having a controller to which they are connected also be mounted to the steering mechanism that rotates relative to a base support portion of a truck frame, and a hydraulic power unit that permits a reduced size and height, with a manual hydraulic cylinder and cylinder body at a substantially similar height, and the cylinder body and oil storage cavity in a concentric arrangement.

15 Claims, 8 Drawing Sheets

(56) References Cited

U.S. PATENT DOCUMENTS

| | | | |
|---|---|---|---|
| 5,618,154 A | 4/1997 | Irons et al. | |
| 5,752,584 A | 5/1998 | Magolo et al. | |
| D408,958 S | 4/1999 | Schneider | |
| 6,125,971 A * | 10/2000 | Niebuhr | B66F 9/07504 187/222 |
| 6,260,646 B1 * | 7/2001 | Fernandez | B62B 3/0612 180/12 |
| D447,612 S | 9/2001 | Niebuhr | |
| 6,296,081 B1 * | 10/2001 | Nagai | B66F 9/08 187/224 |
| D464,785 S | 10/2002 | Gallagher | |
| 7,040,427 B2 | 5/2006 | Toomey | |
| D530,878 S | 10/2006 | Ruppert et al. | |
| D542,004 S | 5/2007 | Righi | |
| D559,498 S | 1/2008 | Ruppert et al. | |
| D562,525 S | 2/2008 | Graf et al. | |
| D565,270 S | 3/2008 | Ruppert et al. | |
| D583,124 S | 12/2008 | Stark | |
| 7,744,335 B1 | 6/2010 | Cleary | |
| 7,774,335 B1 * | 8/2010 | Scofield | G06F 17/30864 707/709 |
| D655,064 S | 2/2012 | Knie | |
| 8,230,976 B2 | 7/2012 | Baldini | |
| 8,246,008 B2 | 8/2012 | De Jong et al. | |
| D674,982 S | 1/2013 | Babel et al. | |
| 8,360,443 B2 | 1/2013 | Ellington | |
| 8,540,213 B2 * | 9/2013 | Feiquan | B66F 9/065 254/2 C |
| D692,202 S | 10/2013 | Feiquan et al. | |
| D692,203 S | 10/2013 | Feiquan et al. | |
| D692,204 S | 10/2013 | Feiquan et al. | |
| 8,752,657 B2 * | 6/2014 | Newell | B62B 5/0033 180/19.2 |
| 2005/0036880 A1 | 2/2005 | Magoto et al. | |
| 2005/0116432 A1 * | 6/2005 | Borrmann | B62B 3/02 280/43.12 |
| 2006/0045696 A1 * | 3/2006 | Church | B66F 9/22 414/490 |
| 2006/0089778 A1 * | 4/2006 | Lindsay | B62B 3/0612 701/70 |
| 2006/0181039 A1 * | 8/2006 | Fridlington | B62B 3/0618 280/43.12 |
| 2009/0260923 A1 | 10/2009 | Baldini | |

OTHER PUBLICATIONS

Website for Shanghai Noblelift Co. Ltd. Guangzhou Subsidiary "Semi-electric Pallet Truck Spt" http:/gdnobliften.en.busytrade.com/products/info/1904267/Semi-electric-Pallet-Truck-Spt.html, accessed Jan. 13, 2012, (4 pages).

Website for Stars for "Electric Vehicle—Electric Pallet Truck," http://www.starstw.com/news/stars-electric-pallet-truck.html, accessed Jan. 13, 2012 (1 page).

Website for Cherry's Industrial Equipment for "SPT15-Semi Electric Pallet Truck" http:/www.pallettruck.com/sptl5.html, accessed Jan. 17, 2012 (1 Page).

E-P Equipment Co., Ltd.—Maximin Electric Pallet Truck EPT20-15ET photographs (1 page).

Brochure for "Walkie Pallet Trucks 4,000-5,000 lbs.", Model MPB040-E issued by Yale Materials Handling Corporation, 2006, (14 pages).

Three (3) color Photographs of the "Walkie Pallet Trucks 4,000-5,000 lbs.", Model MPB040-E by Yale Materials Handling Corporation.

\* cited by examiner

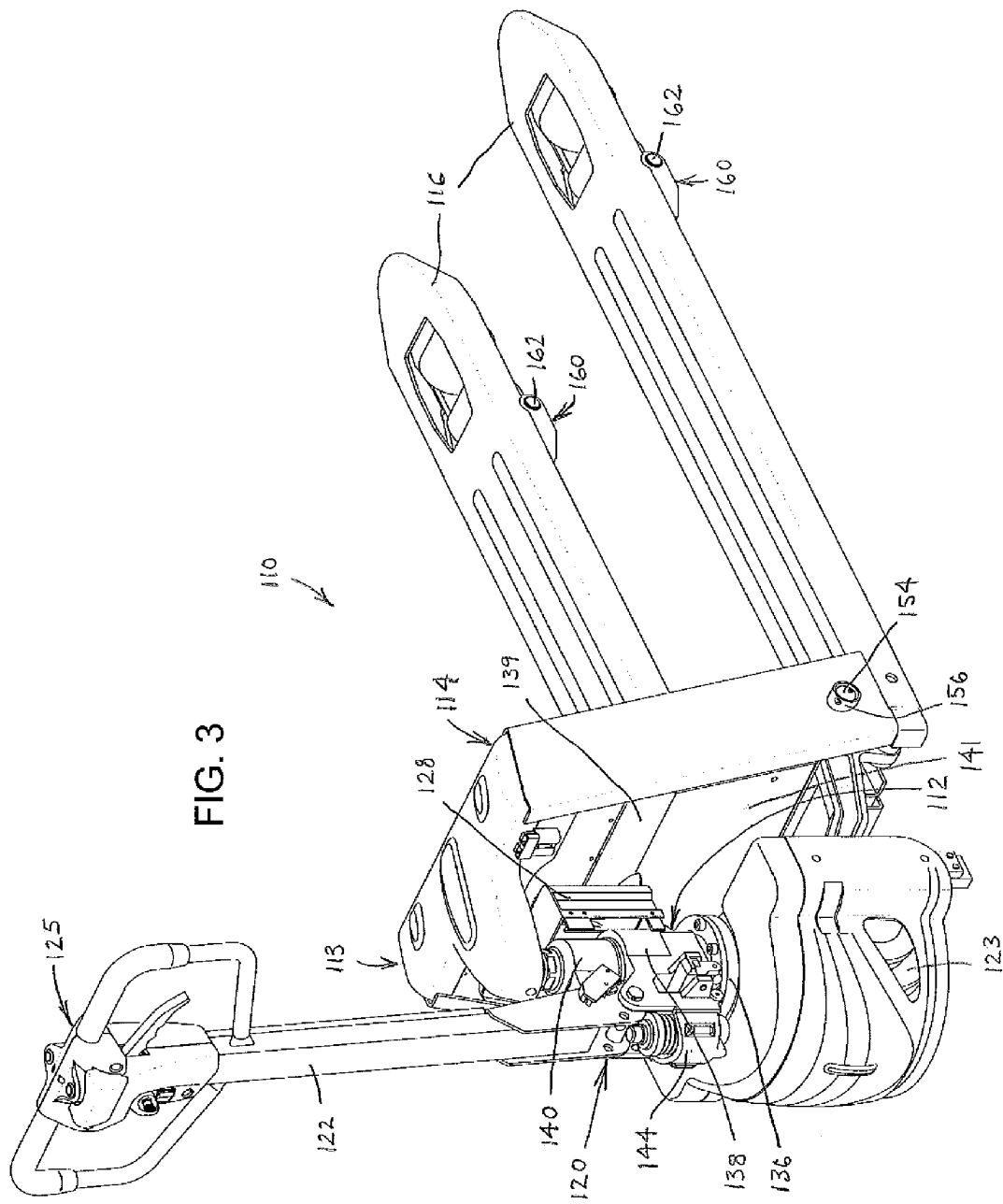

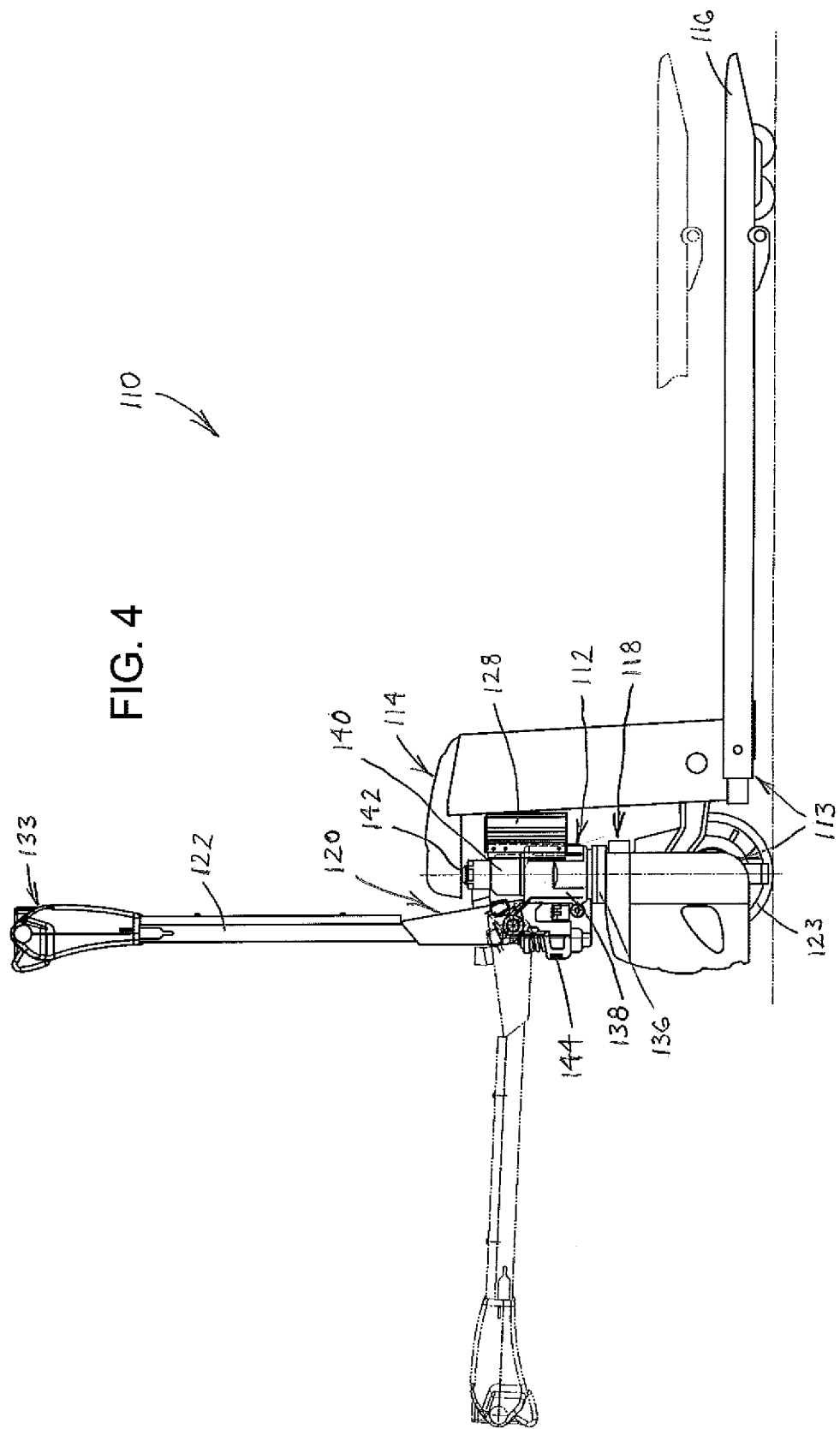

PALLET TRUCK

CROSS-REFERENCE TO RELATED APPLICATIONS

This application claims priority to Chinese Patent Application Nos. 201420418854.7, filed Jul. 25, 2014, and 201420418876.3, filed Jul. 25, 2014, which are hereby incorporated by reference in its entirety.

FIELD OF THE INVENTION

This disclosure relates to industrial lift trucks and, in particular, to electrical systems and hydraulic power units of pallet trucks that are used for lifting and transporting objects, such as pallets upon which goods may be placed.

BACKGROUND OF THE INVENTION

Pallet trucks often are used to lift and maneuver pallets and goods supported thereon during warehousing and for shipping or transportation. Pallet trucks have been developed to provide varying amounts of functionality to an operator and may be generally categorized as either manual or powered. Manual pallet trucks typically include a truck frame having a load lift portion that includes a frame with forks connected thereto, a base support portion or truck which has at least one rear wheel, and a hydraulic jack connected to the load lift portion and base support portion. The hydraulic jack, which is typically a hydraulic bottle jack, is operated by pivotally pumping up and down an operating handle, with the pumping causing the hydraulic bottle jack to raise the frame and the forks of the load lift portion relative to the base support portion or truck and the ground surface.

Once a pallet on the forks of a manual pallet truck has been raised by pumping the operating handle, an operator may steer the pallet truck by using the operating handle as a tiller arm to steer the rear wheel relative to the base support portion or truck. The operating handle is connected to the hydraulic power unit and the at least one rear wheel, such that moving the operating handle to the left or right generates concurrent turning of the hydraulic power unit and the at least one rear wheel. With the pallet raised, the operator pushes or pulls on the operating handle with sufficient force to maneuver the pallet truck, the pallet, and the goods on the pallet to a desired location. As is apparent, maneuvering the pallet truck, the elevated pallet, and the goods thereon is even more difficult when the pallet truck is positioned on an inclined or bumpy surface or within relatively tight confines, such as when offloading pallets from a semi-truck trailer.

A powered pallet truck includes a truck frame having a load lift portion that includes a frame with forks connected thereto, a base support portion or truck having a rear wheel, a hydraulic jack connected to load lift portion and base support portion, and a drive mechanism connected to the rear wheel that assists the operator in maneuvering the pallet truck. Like the manual pallet truck, the powered pallet truck has an operating handle pivotally connected to the hydraulic jack and that serves as a tiller arm that is connected to the rear wheel and rotatably connected to the base support portion or truck, such that moving the operating handle to the left or right causes concurrent turning of the hydraulic jack and the drive wheel for steering the pallet truck. However, the powered pallet truck has a drive mechanism, such as an electric motor, coupled to the rear wheel, which allows an operator to propel and brake the pallet truck by way of controls on the operating handle. This type of pallet truck may be referred to as a powered or a semi-powered pallet truck, as the operator still pumps the pivotable operating handle to activate the hydraulic jack to raise the load lift portion and the forks thereof relative to the base support portion or truck and the ground surface.

An operator, such as an employee of a local delivery service, may make a large number of deliveries throughout a workday wherein each involves loading and unloading pallets and the goods thereon. Requiring the operator to manually pump the operating handle of the pallet truck each time they need to lift a pallet may be ergonomically difficult, particularly when the operator is attempting to move a pallet in limited working areas.

At present, semi-powered pallet trucks are widely used in the material handling and transportation fields, but the hydraulic cylinder and oil storage cavity for the hydraulic jack are separated, with the hydraulic cylinder above the oil storage cavity, causing the height of the hydraulic cylinder to be very high relative to the ground. This, in turn, causes the hydraulic cylinder and oil storage cavity to require more packaging space and the base of the operating handle to be at a relatively high location. This further causes the truck size to be much taller, and increased cost of production and transportation of the pallet truck. In addition, when seeking the same overall truck height configuration, having the base of the operating handle be connected to the hydraulic jack at a higher location on a semi-powered pallet truck may cause the operating handle to be much shorter in length than the similar components on a manual pallet truck. Unfortunately, the shorter operating handle of the powered pallet truck will require more physical effort to operate than the handle of the manual pallet truck.

The drive system of a pallet truck is controlled by a controller. Traditional pallet thick controllers are fixed on a load lift portion or frame having forks. However, the operating handle and the drive motor are installed with parts that are connected to a base support portion that is rearward of the load lift portion. The operating handle and drive motor also tend to rotate left or right relative to the base support portion for steering the pallet truck. With the controller on the forward load lift portion, an output cable on prior art pallet trucks connects the controller and drive motor while they are on parts that pivot and move upward and downward relative to each other. Similarly, a control wiring or harness connects the controller to the operating handle to transmit control signal inputs and current outputs based on operator inputs while the controller and operating handle are on parts that also pivot and move upward and downward relative to each other. During lifting and turning, the output cable and control wiring or harness will follow the disparate movement of the respective parts to which they are connected. As a result, the movement of the control wiring and output cable will be subject to bending and torsion, and may interfere with each other. Long term use with such control wiring and cable routing will tend to result in fatigue fracture of the output cable and control wiring, wherein the control wiring or harness of a prior art pallet truck may be more easily broken. This type of wear and fracture may greatly reduce the service life of the control harness, and in turn, increase the maintenance cost of the pallet truck.

SUMMARY OF THE INVENTION

In accordance with one aspect of the invention, a pallet truck having an electrical system is provided, wherein the pallet truck includes a truck frame having a load lift portion and a base support portion coupled to and rearward of the load lift portion, a steering mechanism rotatably connected to the truck frame at the base support portion, a power source mounted to the load lift portion, a controller mounted to the steering mechanism, the controller and power source being connected by a power cable, the controller and the steering mechanism being connected by control wiring and an output cable.

In accordance with another aspect of the invention, a hydraulic power unit for a pallet truck is provided having an installation pedestal, a cylinder body, an oil storage cavity, a push rod, an operating handle, and a manual hydraulic cylinder, wherein the manual hydraulic cylinder is located above the installation pedestal, the operating handle is connected to the manual hydraulic cylinder, the manual hydraulic cylinder and the cylinder body are at a substantially similar height, the oil storage cavity extends above the cylinder body, and the push rod is located above the oil storage cavity.

The new electrical structure includes installing the controller on a steering mechanism that rotates relative to the base support portion and load support portion for the purpose of steering. The controller, output cable and control wiring will rotate along with the rotation of the steering mechanism, thereby maintaining a position that is static in terms of relative motion. Only the power cable that connects the controller to the power source, such as batteries, will twist or bend during lifting or turning of the load lift portion relative to the base support portion and the steering mechanism. In this manner, the stresses imparted on the output cable and control wiring is reduced. The fatigue resistance of the power cable typically is better than for the output cable or control wiring, which permits the power cable to be much easier to trouble shoot and repair, if it is damaged. The arrangement improves the service life of the output cable and control wiring or harness by avoiding damage that would otherwise occur during repeated bending and torsion. This improved electrical structure of a pallet truck increases the utilization of the pallet truck, and reduces the cost of maintenance, while extending the service life.

The traditional structure of a prior art hydraulic cylinder and an oil cavity are separated, typically with the oil cavity being at or below the height of the cylinder. The inventive structure herein includes a concentric arrangement of the hydraulic cylinder and the oil storage cavity, which optimizes the oil pathways and allows the hydraulic power unit to achieve the same fluid effect as with a traditional structure, while not increasing the difficulty of production. This also results in a hydraulic power unit that is of shorter height, permitting wider adaptation and a more visually pleasing structure. Thus, the cylinder height can be reduced, which may save production cost. This, in turn, reduces the height of the location where the base of the operating handle is pivotally connected to the manual hydraulic cylinder, which permits use of a longer operating handle. The longer operating handle having a lower pivotal connection allows an operator to pump the operating handle more easily to lift the same weight, better accommodates of operators of different heights, and provides better mechanical advantage when using the operating handle to steer the pallet truck.

BRIEF DESCRIPTION OF THE DRAWINGS

FIG. 3 is a rear perspective view of a pallet truck incorporating the electrical system of FIG. 2A and the hydraulic power unit and controller of FIG. 2B;

FIG. 4 is a side elevation view of the pallet truck of FIG. 3 showing the range of positions of movement of the operating handle and the forks;

DETAILED DESCRIPTION

Figure 1B:
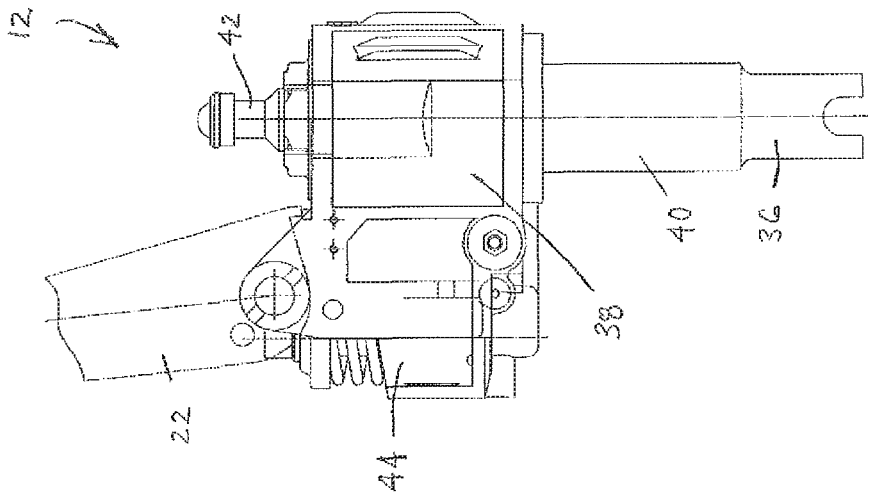
FIG. 1B is a side elevation view of the hydraulic power unit of the pallet truck of FIG. 1A.
Figure 1A:
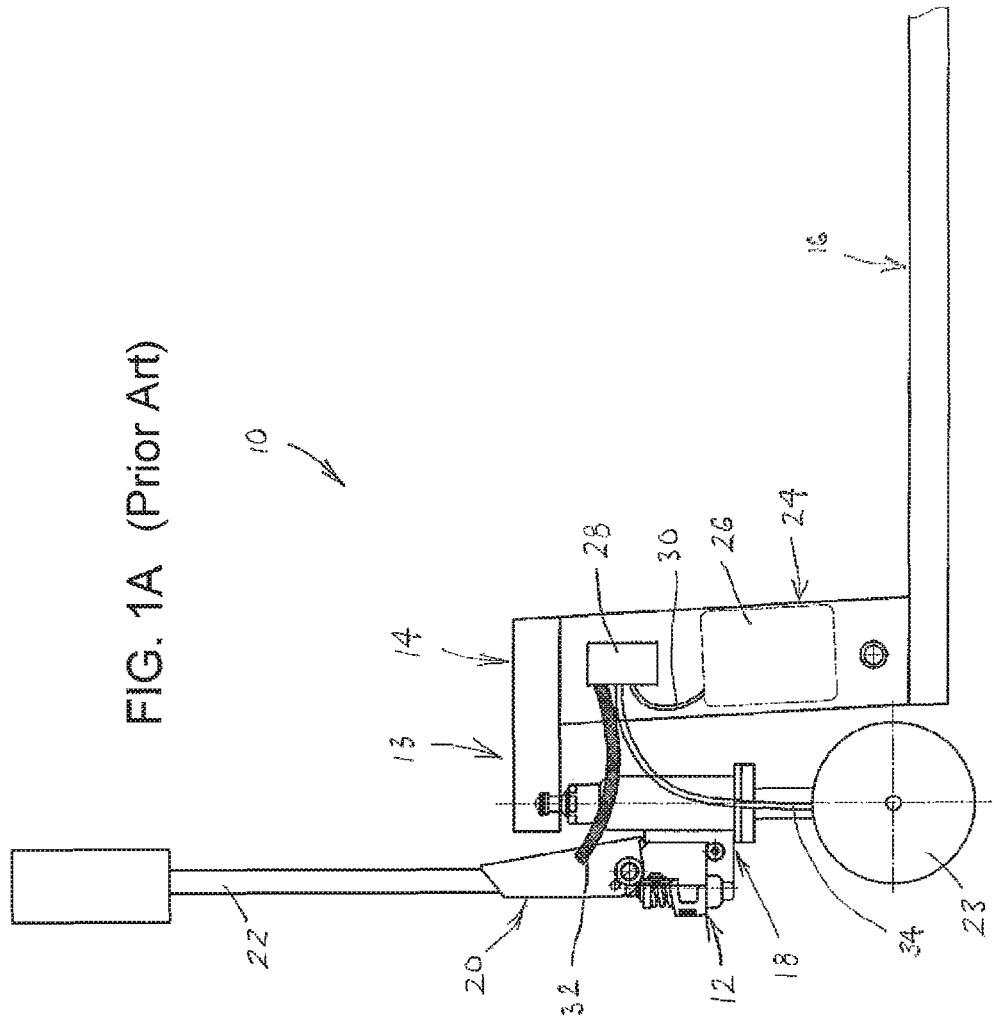
FIG. 1A shows a hydraulic power unit and a simplified electrical system diagram for a traditional pallet truck.

FIG. 1A shows a simplified diagram of a traditional layout of a pallet truck 10. FIG. 1B shows a hydraulic power unit 12 of the pallet truck 10. The pallet truck 10 generally includes a truck frame 13 having a load lift portion 14 with forks 16 extending forward therefrom. The truck frame 13 further includes a base support portion 18 that is coupled to and rearward of the load lift portion 14. The load lift portion 14 is movable up and down relative to the base support portion 18 to lift and lower pallets and/or goods positioned on the forks 16 relative to the ground.

A steering mechanism 20 includes an operating handle 22 and a drive wheel 23, wherein the operating handle 22 may be used as a tiller arm to rotate the steering mechanism 20 to direct the rear drive wheel 23 toward the left or right relative to the truck frame 13, so as to steer the pallet truck 10. A power source 24, such as in the form of a battery 26, and a controller 28 are mounted to the load lift portion 14. The power source 24 and controller 28 are connected by a power cable 30, while the controller 28 is connected to the operating handle 22 of the steering mechanism 20 by control wiring 32. The drive wheel 23 of the steering mechanism 20 is coupled to a drive motor, not shown. The drive motor is connected to the controller 28 by an output cable shown as cable 34. With this traditional electrical system layout of cables and control wiring, when the steering mechanism 20 is rotated to the left or right relative to the base support portion 18, or the load lift portion 14 is lifted or lowered, the control wiring 32 and cable 34 may be subjected to excessive bending, torsion or interference with each other, promoting fatigue in or damage to these wiring and cable components, which may result in premature failure.

The hydraulic power unit 12 of the traditional pallet truck 10 is shown having an installation pedestal 36 that is installed on the base support portion 18. The hydraulic power unit 12 further includes a cylinder body 38, an oil storage cavity 40, a push rod 42, and a manual hydraulic cylinder 44. As is apparent in this arrangement, the oil storage cavity 40 is above the installation pedestal 36, with the cylinder body 38 then being above the oil storage cavity

40. The manual hydraulic cylinder 44 is connected to the cylinder body 38 and they are at the same or a substantially similar height.

The aforementioned stack up of components presents a rather substantial height for the traditional hydraulic power unit 12, which causes the operating handle 22 to be connected to the manual hydraulic cylinder 44 at a high location relative to the ground. This further causes the operating handle 22 to be relatively shorter in length, so as not to have its distal end be overly high when in its upward most position. This higher position of the base of the operating handle 22 and its relatively shorter length result in the need for fairly substantial or increased operator power or effort to operate the manual hydraulic cylinder 44, and to turn the operating handle 22 to steer the pallet track 10. Also, the push rod 42 being located above the cylinder body 38, which in turn is located above the drive wheel 23, makes it difficult and more costly to design structures that are not relatively tall, especially when the push rod 42 is extended upward while lifting the load lift portion 14.

Figure 2B:
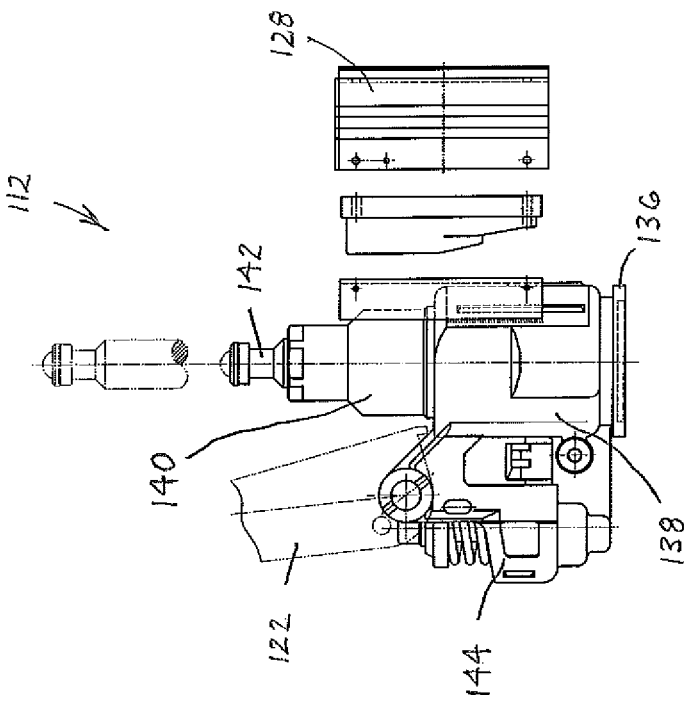
FIG. 2B is a partially exploded side elevation view of the hydraulic power unit and the controller of the pallet truck of FIG. 2A.

Turning to FIGS. 2A-8, an example pallet truck 110 in accordance with the present invention is disclosed. 2A shows a simplified diagram of an example layout of a pallet truck 110, while FIG. 2B shows a hydraulic power unit 112 thereof. The pallet truck 110 generally includes a truck frame 113 having a load lift portion 114 with forks 116 extending forward therefrom. The truck frame 113 further includes a base support portion 118 that is coupled to and rearward of the load lift portion 114. The hydraulic power unit 112 is configured to lift and lower the load lift portion 114 relative to the base support portion 118 to lift and lower pallets and/or goods positioned on the forks 116 relative to the ground.

The pallet truck 110 further has a steering mechanism 120 that is rotatably connected to the truck frame 113 at the base support portion 118, and includes a drive wheel 123. In this example, hydraulic power unit 112 also functions as a part of the steering mechanism 120. A controller 128 is mounted to the steering mechanism 120 in this example, by being connected to the hydraulic power unit 112. The controller 128 and power source 124 are connected by a power cable 130, while the controller 128 is connected to the steering mechanism 120 by control wiring 132, which may be in the form of individual wires or a wiring harness, and by output cable 134.

Figure 5:
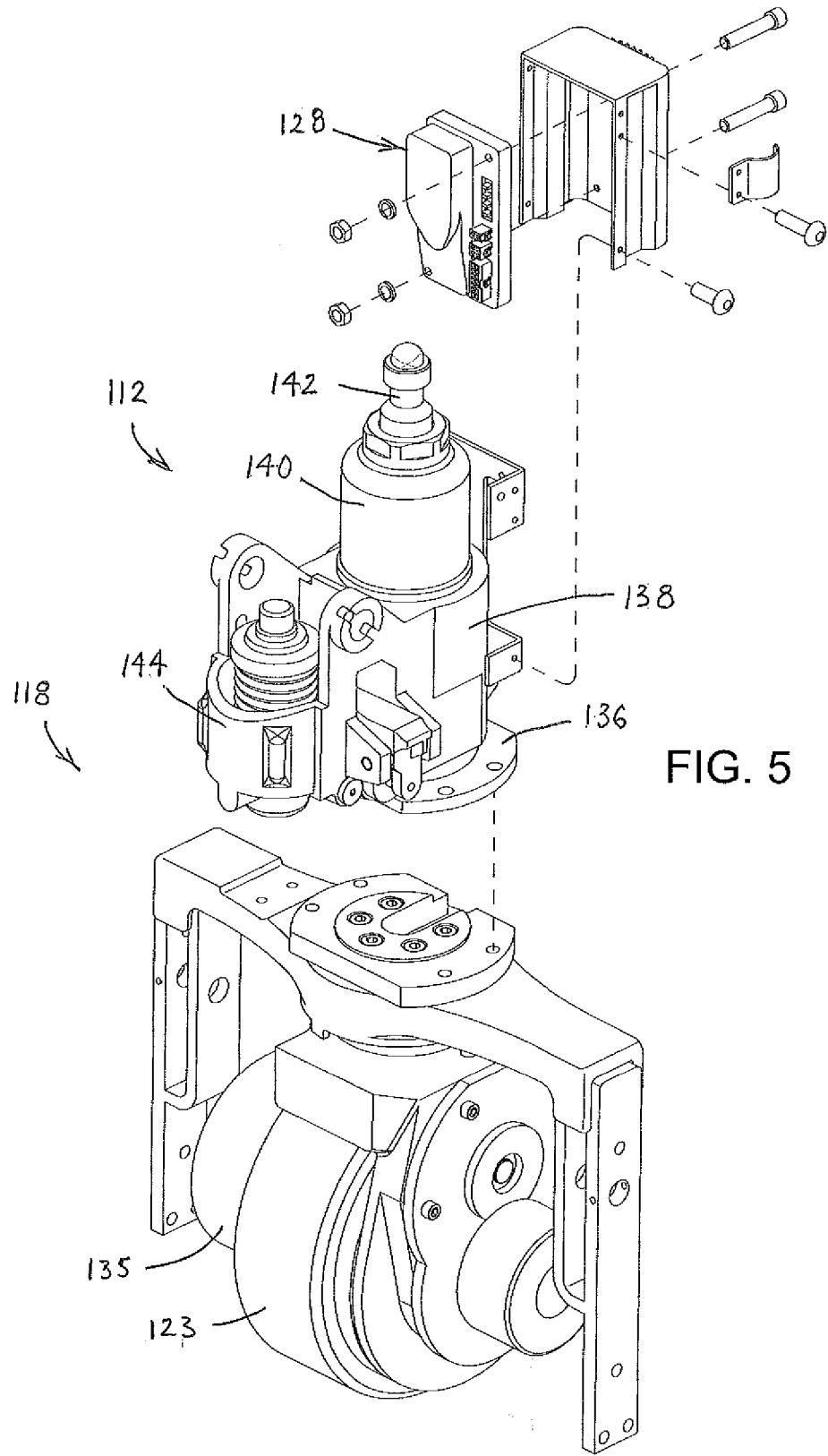
FIG. 5 is an exploded perspective view of the mounting of the controller to the hydraulic power unit and the hydraulic power unit to the base support portion.
Figure 6:
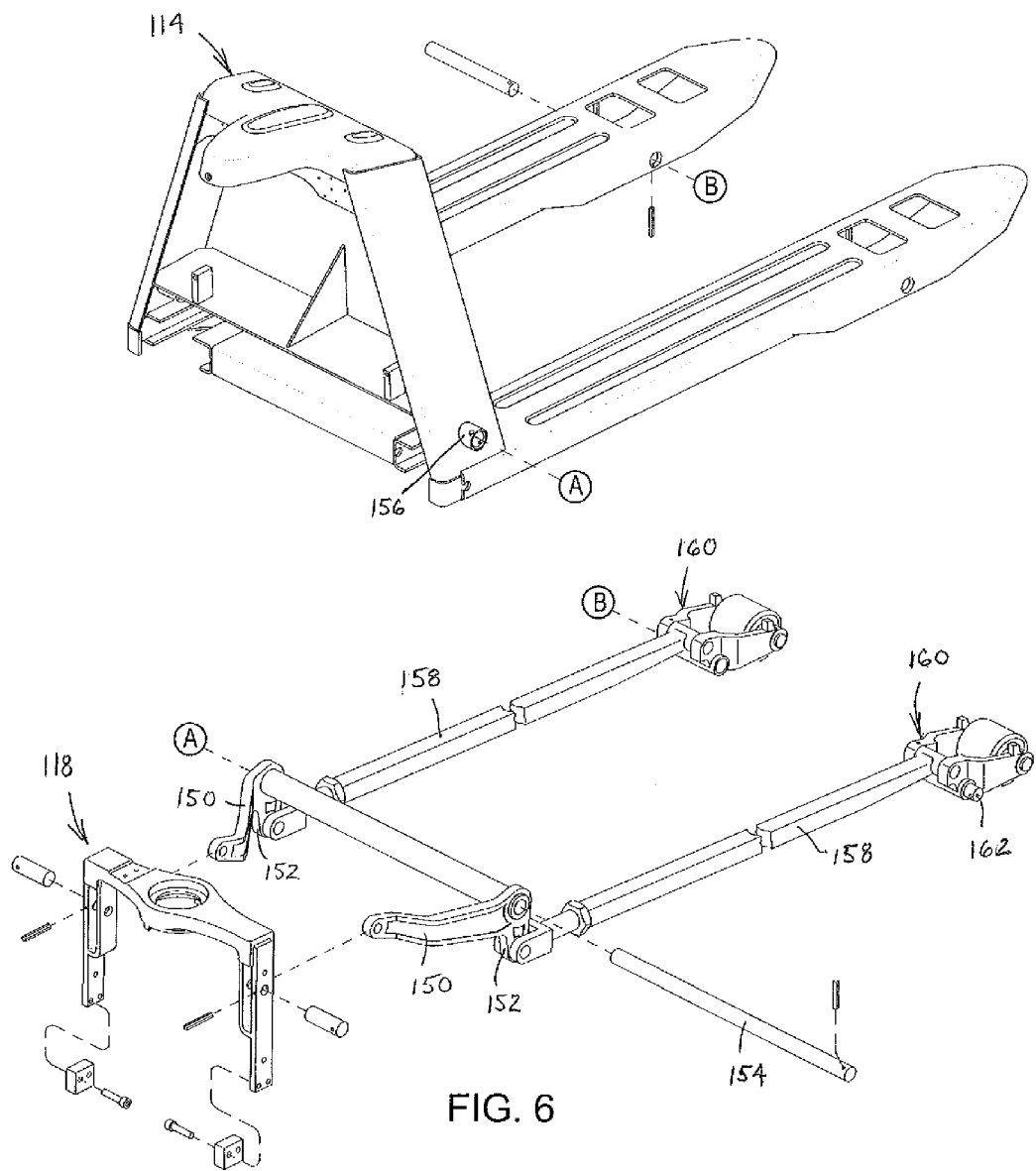
FIG. 6 is a partially exploded perspective view of the load lift portion and its linkage for raising and lowering the forks relative to the base support portion.

The drive wheel 123 of the steering mechanism 120 is coupled to a drive motor 135, as may be seen in FIG. 5. The drive motor 135 is connected to the controller 128 by the output cable 134. The steering mechanism 120 further that includes an operating handle 122 that may be used as a tiller arm to rotate the steering mechanism 120 to direct the rear drive wheel 123 toward the left or right relative to the truck frame 113, so as to steer the pallet truck 110. The operating handle 122 of the steering mechanism 120 also includes hand controls 125 at its distal end, which are connected to the control wiring 132. The hand controls 125 may be used by an operator to control the pallet truck 110.

Figure 2A:
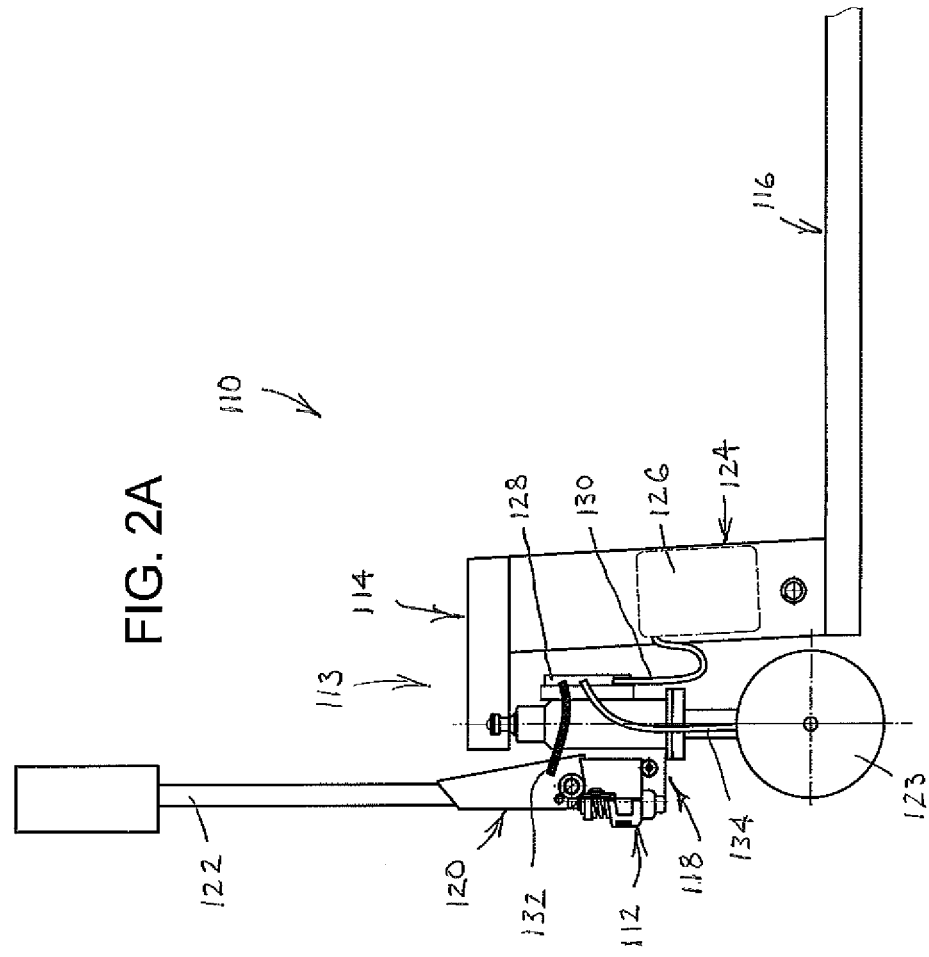
FIG. 2A shows a hydraulic power unit and a simplified electrical system diagram for a pallet truck generally of the present invention.

The drive motor 135 that is coupled to the drive wheel 123 of the steering mechanism 120 is connected to the controller 128 by an output cable shown in FIG. 2A as cable 134. The hand controls 125 on the operating handle 122 that may be seen in FIG. 3 receive inputs from an operator and convert the inputs into operation signals for the controller 128. In one form, the controller 128 may be a Curtis® brand transistor speed control. In response to signals from the hand controls 133, the controller 128 may send corresponding control signals to the drive motor 135 via the output cable 134 to propel the pallet truck 110 forward or rearward and/or and receive feedback from the drive motor 135.

Figure 7:
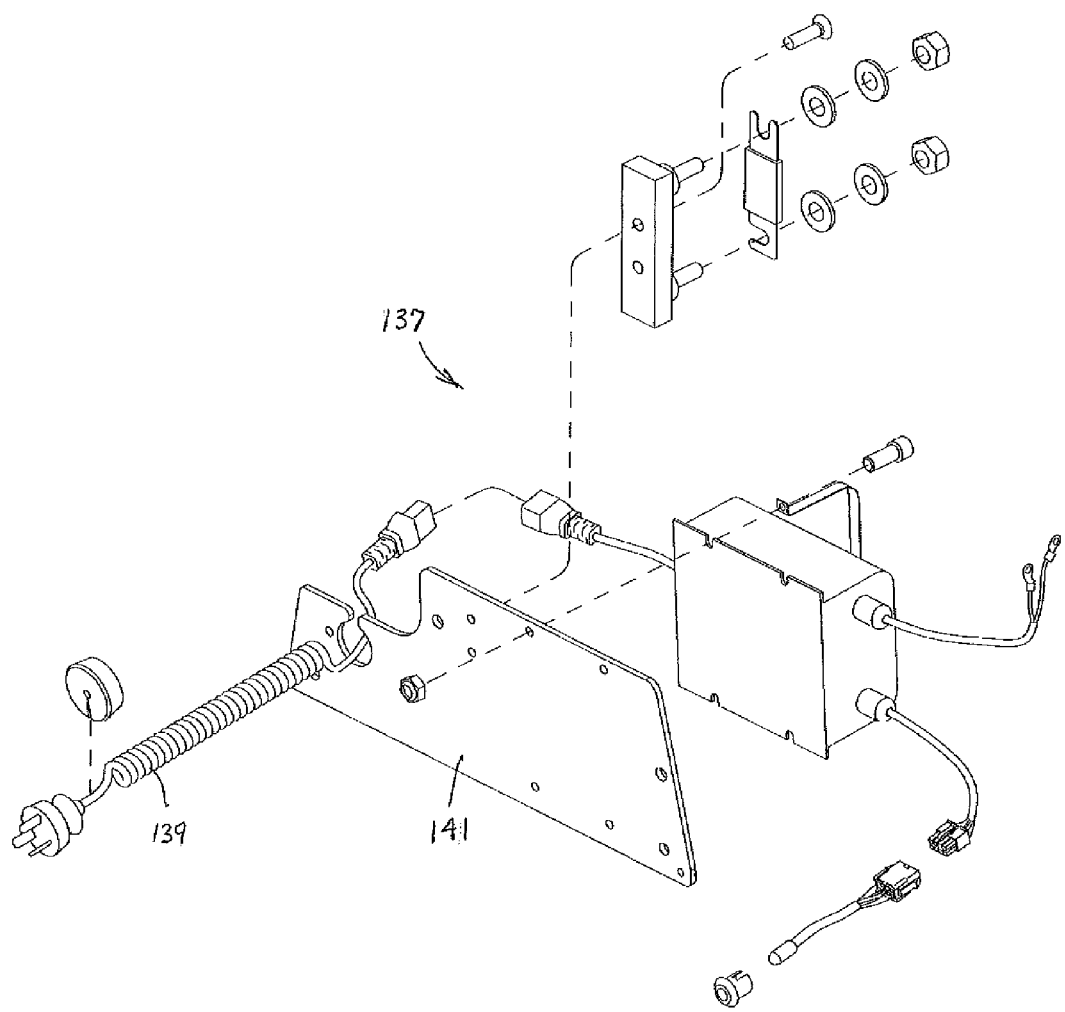
FIG. 7 is a partially exploded perspective view of the power source controller that is mounted to the load lift portion of the pallet truck of FIGS. 2A and 3.
Figure 8:
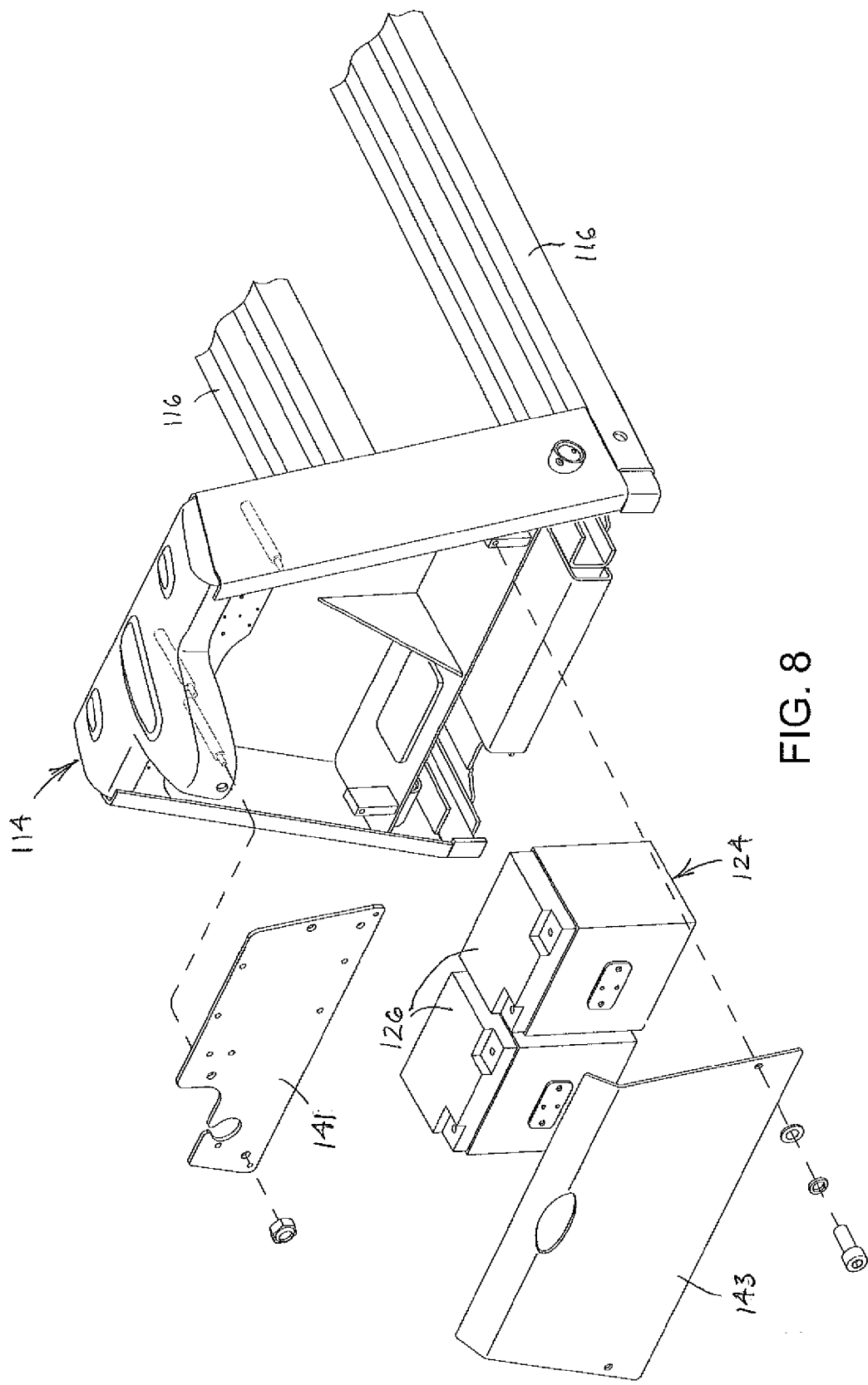
FIG. 8 is a partially exploded view of the mounting of the power source within the load lift portion of the pallet truck of FIGS. 2A and 3.

As seen in FIGS. 7 and 8, the electrical system also may include a battery charging controller 137 that is connected to the power source 124 and the controller 128. The charging controller 137 may be, for example, a 110V AC plug-in automatic charger, conveniently connectable to a wall outlet via an extendable cord 139. Also, the charging controller 137 may be mounted within the load lift portion 114 and be protected and concealed by a cover plate 141, while the power source 124 is protected and concealed by a cover plate 143.

With the advantageous electrical system of the pallet truck 110, when the steering mechanism 120 is rotated to steer the pallet truck 110, the drive wheel 123 will turn relative to the base support portion 118 and the load lift portion 114 of the truck frame 113, the controller 128 will rotate along with the steering mechanism 120 and the drive wheel 123, and will always maintain a static position relative to them, and therefore, avoid bending and torsion. Also, when the operating handle 122 of the steering mechanism 120 is used to operate the manual hydraulic cylinder 144 to lift or lower the load lift portion 114 relative to the base support portion 118 and the ground, the control wiring 132 and cable 136 will remain in a static position relative to their end connections, and similarly avoid bending and torsion. This configuration will reduce potential damage during use, which improves the service life and lowers the cost of operation and maintenance.

The pallet truck 110 is shown with a hydraulic power unit 112 having an installation pedestal 136. The hydraulic power unit 112 further includes a cylinder body 138, an oil storage cavity 140, a push rod 142, and a manual hydraulic cylinder 144. In this example, the oil storage cavity 140 is concentric with the cylinder body 138 instead of being below it, permitting a lower overall height of the assembly. As such, the push rod 142 can be lower than in the traditional prior art design, which allows the cylinder body 138 to be of shorter height, which can save material and production costs.

The operating handle 122 of the steering mechanism 120 is pivotally connected to the manual hydraulic cylinder 144 to be able to activate the manual hydraulic cylinder 144 by pumping the operating handle 122 up and down at its distal end. The manual hydraulic cylinder 144 and cylinder body 138 are at the same or a substantially similar height, so that with the shorter hydraulic power unit 112, the base of the operating handle 122 may be at a lower location relative to the operating handle of the traditional prior art pallet truck 10. Having an operating handle 122 of this example that is lower to the ground permits the operating handle 122 to be longer in length if the distal end of the operating handle 122 is to be at a comparable height to that of a traditional prior art pallet truck. This extra length of the operating handle 122 provides better leverage and requires less effort from an operator when pumping or turning the operating handle 122.

The pumping of the operating handle 122 between its upper and lower most positions, as may be seen in FIG. 4, causes the manual hydraulic cylinder 144 to lift the forks 116. This occurs when the push rod 142 forces the load lift portion 114 upward relative to the base support portion 118, which as may be appreciated in FIG. 6, causes bell cranks 150 and their trailing arms 152 to pivot on an axle 154 that is attached to the load lift portion 114 at couplings 156. The trailing arms 152 are connected to lift bars 158, which in turn are connected to load roller assemblies 160. The load roller assemblies 160 are pivotally connected to the forks 116 by shafts 162. Accordingly, activating the manual hydraulic cylinder 144 to raise the load lift portion 114 causes the couplings 156 and axle 154 therein to lift upward, which pivots the bell cranks 150 and trailing arms 152. This, in turn, shifts the lift bars 158 in a forward direction, causing the load roller assemblies 160 to pivot about the shafts 162, raising the forks 116.

Thus, the length of the operating handle 122 may be sized to provide improved mechanical advantage to assist in pumping the manual hydraulic cylinder 144, but also to assist in turning of the drive wheel 123 and drive motor 135 mounted therein. This gives the example pallet truck 110 advantages of having a compact structure, lower cost, and less effort to operate the manual hydraulic cylinder 144 to lift the load lift portion 114 and to turn the drive wheel 123 relative to the truck frame 113 to steer the pallet truck 110.

It will be understood that various changes, modifications, alterations, and combinations in the details, materials, and arrangements of the parts and components that have been described and illustrated in order to explain the nature of the pallet truck as described herein may be made by those skilled in the art within the principle and scope of this disclosure.

What is claimed is:

1. A pallet truck having an electrical system comprising: a truck frame, the truck frame having a load lift portion and a base support portion coupled to and rearward of the load lift portion, a steering mechanism rotatably connected to the truck frame at the base support portion, a manual hydraulic power unit connected to the steering mechanism and being coupled at an upper end to the load lift portion and at a lower end to the base support portion, the steering mechanism further comprising an operating handle, a power source mounted to the load lift portion, a controller mounted to the steering mechanism proximate the manual hydraulic power unit, the controller and power source being connected by a power cable, the controller and the steering mechanism being connected by control wiring, the controller and a drive motor being connected by an output cable, wherein when the operating handle is turned to steer, the steering mechanism, manual hydraulic power unit, controller, control wiring and output cable rotate together relative to the base support portion.

2. The pallet truck in accordance with claim 1, wherein the lower end of the manual hydraulic power unit further comprises an installation pedestal that is installed on the base support portion.

3. The pallet truck in accordance with claim 2, wherein the controller is connected to the operating handle by the control wiring.

4. The pallet truck in accordance with claim 1, wherein the hydraulic power unit is configured to lift the load lift portion relative to the base support portion.

5. The pallet truck in accordance with claim 1, wherein the operating handle is connected to the hydraulic power unit.

6. The pallet truck in accordance with claim 1, wherein the manual hydraulic power unit further comprises a manual hydraulic cylinder and an oil storage cavity arranged concentrically with a cylinder body of the manual hydraulic cylinder.

7. The pallet truck in accordance with claim 6, wherein the operating handle is configured to operate the manual hydraulic cylinder via pivotal movement of the operating handle.

8. The pallet truck in accordance with claim 1, wherein when the operating handle is turned to steer the vehicle, the power cable twists or bends between the controller and the power source.

9. The pallet truck in accordance with claim 1, wherein a charging controller is mounted on the load lift portion and is connected to the power source.

10. The pallet truck in accordance with claim 1, wherein the steering mechanism further comprises a drive wheel.

11. The pallet truck in accordance with claim 10, wherein the drive motor is coupled to the drive wheel.

12. The pallet truck in accordance with claim 11, wherein the drive motor is located within the drive wheel.

13. A hydraulic power unit for a pallet truck comprising: an installation pedestal, a cylinder body, an oil storage cavity, a push rod, an operating handle, and a manual hydraulic cylinder, wherein the manual hydraulic cylinder is located above the installation pedestal, the operating handle is connected to the manual hydraulic cylinder, the manual hydraulic cylinder and the cylinder body are at a substantially similar height, the oil storage cavity extends above the cylinder body, the push rod is located above the oil storage cavity, and wherein the operating handle is configured to operate the manual hydraulic cylinder via pivotal movement of the operating handle.

14. The hydraulic power unit for a pallet truck in accordance with claim 13, wherein the cylinder body and oil storage cavity are concentrically arranged.

15. The hydraulic power unit for a pallet truck in accordance with claim 13, wherein the oil storage cavity is located adjacent the manual hydraulic cylinder.

* * * * *